United States Patent
Chen et al.

(10) Patent No.: US 10,740,024 B1
(45) Date of Patent: Aug. 11, 2020

(54) MINIMIZING RUNTIME FEATURE OVERHEAD IN A STORAGE SYSTEM

(71) Applicant: EMC IP Holding Company LLC, Hopkinton, MA (US)

(72) Inventors: Xiangping Chen, Sherborn, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/375,001

(22) Filed: Apr. 4, 2019

(51) Int. Cl.
*G06F 3/06* (2006.01)

(52) U.S. Cl.
CPC .............. *G06F 3/065* (2013.01); *G06F 3/061* (2013.01); *G06F 3/0629* (2013.01); *G06F 3/0683* (2013.01)

(58) Field of Classification Search
CPC ........ G06F 3/065; G06F 3/061; G06F 3/0629; G06F 3/0683; G06F 3/067; G06F 3/06; G06F 3/0619; G06F 3/0631; G06F 3/0673; G06F 3/0604; G06F 3/0644; G06F 3/0671; G06F 3/063; G06F 3/0632; G06F 3/0637; G06F 3/0689; G06F 3/0622; G06F 17/30; G06F 12/00
USPC ........................................................ 711/154
See application file for complete search history.

(56) References Cited

U.S. PATENT DOCUMENTS

| | | |
|---|---|---|
| 7,475,124 B2 | 1/2009 | Jiang et al. |
| 8,327,103 B1 | 12/2012 | Can et al. |
| 8,380,928 B1 | 2/2013 | Chen et al. |
| 8,429,346 B1 | 4/2013 | Chen et al. |
| 8,515,911 B1 | 8/2013 | Zhou et al. |
| 8,539,148 B1 | 9/2013 | Chen et al. |
| 8,566,483 B1 | 10/2013 | Chen et al. |
| 8,583,607 B1 | 11/2013 | Chen et al. |
| 8,683,153 B1 | 3/2014 | Long et al. |
| 8,712,976 B1 | 4/2014 | Chen et al. |
| 8,775,388 B1 | 7/2014 | Chen et al. |
| 8,782,324 B1 | 7/2014 | Chen et al. |
| 8,799,601 B1 | 8/2014 | Chen et al. |
| 8,909,887 B1 | 12/2014 | Armangau et al. |

(Continued)

OTHER PUBLICATIONS

U.S. Appl. No. 15/499,943, filed Apr. 28, 2017, Kucherov et al.

(Continued)

*Primary Examiner* — Mano Padmanabhan
*Assistant Examiner* — Jean C Edouard
(74) *Attorney, Agent, or Firm* — Daly, Crowley, Mofford & Durkee, LLP (57) ABSTRACT

In one aspect, runtime feature overhead minimization is provided for a storage system. An aspect includes providing a system table having features available to the system and a field indicating whether a feature is enabled. An aspect also includes providing a configuration table for data modules in the system that includes features available to storage units managed by the data modules and a field that indicates whether a feature is enabled for a storage unit. Upon receiving a request that includes a selected storage unit, the data modules access the system table. For each feature in the system table, the data modules determine whether the feature is set to enabled via the corresponding flag field. Upon determining the feature is set to disabled via the corresponding flag field in the system table, performing an operation identified in the request without accessing the configuration table.

18 Claims, 6 Drawing Sheets

(56) References Cited

U.S. PATENT DOCUMENTS

| | | |
|---|---|---|
| 8,930,746 B1 | 1/2015 | Chen et al. |
| 8,954,699 B1 | 2/2015 | Chen et al. |
| 8,977,812 B1 | 3/2015 | Chen et al. |
| 9,152,336 B1 | 10/2015 | Chen et al. |
| 9,208,162 B1 | 12/2015 | Hallak et al. |
| 9,304,889 B1 | 4/2016 | Chen et al. |
| 9,355,112 B1 | 5/2016 | Armangau et al. |
| 9,384,206 B1 | 7/2016 | Bono et al. |
| 9,395,937 B1 | 7/2016 | Si et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,684,593 B1 | 6/2017 | Chen et al. |
| 9,710,187 B1 | 7/2017 | Si et al. |
| 9,811,288 B1 | 11/2017 | Chen et al. |
| 9,817,766 B1 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,176,046 B1 | 1/2019 | Hu et al. |
| 10,235,066 B1 | 3/2019 | Chen et al. |
| 10,248,623 B1 | 4/2019 | Chen et al. |
| 10,261,853 B1 | 4/2019 | Chen et al. |
| 10,310,951 B1 | 6/2019 | Chen et al. |
| 10,324,640 B1 | 6/2019 | Chen et al. |
| 10,338,851 B1 | 7/2019 | Kronrod et al. |
| 10,353,616 B1 | 7/2019 | Tao et al. |
| 10,359,968 B1 | 7/2019 | Chen et al. |
| 10,374,792 B1 | 8/2019 | Meiri et al. |
| 10,394,485 B1 | 8/2019 | Chen et al. |
| 10,402,283 B1 | 9/2019 | Chen et al. |
| 10,409,493 B1 | 9/2019 | Kucherov et al. |
| 10,459,632 B1 | 10/2019 | Chen et al. |
| 10,459,883 B1 | 10/2019 | Meiri et al. |
| 10,496,489 B1 | 12/2019 | Chen et al. |
| 10,496,668 B1 | 12/2019 | Meiri et al. |
| 10,496,672 B2 | 12/2019 | Meiri et al. |
| 10,565,058 B1 | 2/2020 | Meiri et al. |
| 10,613,793 B1 | 4/2020 | Hu et al. |
| 2006/0282638 A1* | 12/2006 | Oshima ............... G06F 3/0632 711/170 |
| 2007/0079088 A1* | 4/2007 | Deguchi ............... G06F 3/0634 711/162 |
| 2016/0259586 A1* | 9/2016 | Tylik ................... G06F 3/0689 |

OTHER PUBLICATIONS

U.S. Appl. No. 15/499,949, filed Apr. 28, 2017, Chen et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 16/042,363, filed Jul. 23, 2018, Chen et al.
U.S. Appl. No. 16/038,543, filed Jul. 18, 2018, Chen et al.
U.S. Appl. No. 16/048,767, filed Jul. 30, 2018, Chen et al.
U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 16/375,001, filed Apr. 4, 2019, Chen et al.
U.S. Appl. No. 16/380,087, filed Apr. 10, 2019, Kronrod et al.
U.S. Appl. No. 16/592,271, filed Oct. 3, 2019, Chen et al.
U.S. Appl. No. 16/592,328, filed Oct. 3, 2019, Barabash et al.
U.S. Appl. No. 16/667,453, filed Oct. 29, 2019, Chen et al.
U.S. Appl. No. 16/668,661, filed Oct. 30, 2019, Kronrod et al.
U.S. Appl. No. 16/743,274, filed Jan. 15, 2020, Chen et al.
U.S. Appl. No. 16/747,169, filed Jan. 20, 2020, Chen et al.
U.S. Appl. No. 16/786,422, filed Feb. 10, 2020, Kronrod et al.
U.S. Appl. No. 16/788,461, filed Feb. 12, 2020, Chen et al.
U.S. Appl. No. 16/773,303, filed Jan. 27, 2020, Hu et al.
U.S. Appl. No. 16/511,676, filed Jul. 15, 2019, Chen et al.
U.S. Appl. No. 16/864,272, filed May 1, 2020, Chen et al.

* cited by examiner

MINIMIZING RUNTIME FEATURE OVERHEAD IN A STORAGE SYSTEM

BACKGROUND

Many modern storage systems provide extensive value-added features for its customers. These features can provide significant value to those customers who are actively using the features; however, they come with performance overhead costs for those customers who are not actively using the features. For example, features such as synchronous replication, Quality of Service, or online system checkpoint, require that the system perform checks to determine whether the feature is enabled and active for every data update request entering the system, regardless of whether the storage unit the request is written to has the feature configured/enabled or not. In high performance storage systems with lots of feature capability, such as XtremIO products by Dell® of Hopkinton, Mass., this presents a potential risk during failure recovery. For example, data modules are unable to service input/output (IO) requests until all feature-related configurations become available during module restart.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method to minimize runtime feature overhead in a storage system. The method includes providing, for a management module of the storage system, a system table having a listing of features that are available for the storage system. The system table includes a flag field for each of the features that indicates whether a corresponding feature in the listing of features is currently enabled in the storage system. The method also includes providing, for each data module of a plurality of data modules in the storage system, a configuration table having a listing of features available to one or more storage units under management of the corresponding data module. The configuration table includes a flag field for each of the features that indicates whether a corresponding feature in the listing of features for the configuration table is enabled for the corresponding one or more storage units. Upon receiving, at the management module, an input/output (IO) request from a client system that includes a selected storage unit of the storage units, the method includes accessing the system table. For each feature in the system table, the data modules determine whether the feature is set to enabled via the corresponding flag field. Upon determining the feature is set to enabled in the system table, the method includes accessing configuration information in the configuration table for the enabled feature. The one or more data modules associated with the selected storage unit perform an operation identified in the request pursuant to the configuration information. Upon determining the feature is set to disabled via the corresponding flag field in the system table, the one or more data modules associated with the selected storage unit perform an operation identified in the request without accessing the configuration table.

Another aspect may provide a system for minimizing runtime feature overhead in a storage system environment. The system includes a memory having computer-executable instructions. The system also includes a processor operated by a storage system. The processor executes the computer-executable instructions. When executed by the processor, the computer-executable instructions cause the processor to perform operations. The operations include providing, for a management module of the storage system, a system table having a listing of features that are available for the storage system. The system table includes a flag field for each of the features that indicates whether a corresponding feature in the listing of features is currently enabled in the storage system. The operations also include providing, for each data module of a plurality of data modules in the storage system, a configuration table having a listing of features available to one or more storage units under management of the corresponding data module. The configuration table includes a flag field for each of the features that indicates whether a corresponding feature in the listing of features for the configuration table is enabled for the corresponding one or more storage units. Upon receiving, at the management module, an input/output (IO) request from a client system that includes a selected storage unit of the storage units, the operations include accessing the system table. For each feature in the system table, the data modules determine whether the feature is set to enabled via the corresponding flag field. Upon determining the feature is set to enabled in the system table, the operations include accessing configuration information in the configuration table for the enabled feature. The one or more data modules associated with the selected storage unit perform an operation identified in the request pursuant to the configuration information. Upon determining the feature is set to disabled via the corresponding flag field in the system table, the one or more data modules associated with the selected storage unit perform an operation identified in the request without accessing the configuration table.

Another aspect may provide a computer program product embodied on a non-transitory computer readable medium. The computer program product includes instructions that, when executed by a computer at a storage system, causes the computer to perform operations. The operations include providing, for a management module of the storage system, a system table having a listing of features that are available for the storage system. The system table includes a flag field for each of the features that indicates whether a corresponding feature in the listing of features is currently enabled in the storage system. The operations also include providing, for each data module of a plurality of data modules in the storage system, a configuration table having a listing of features available to one or more storage units under management of the corresponding data module. The configuration table includes a flag field for each of the features that indicates whether a corresponding feature in the listing of features for the configuration table is enabled for the corresponding one or more storage units. Upon receiving, at the management module, an input/output (IO) request from a client system that includes a selected storage unit of the storage units, the operations include accessing the system table. For each feature in the system table, the data modules determine whether the feature is set to enabled via the corresponding flag field. Upon determining the feature is set to enabled in the system table, the operations include accessing configuration information in the configuration table for the enabled feature. The one or more data modules associated with the selected storage unit perform an operation identified in the request pursuant to the configuration information. Upon determining the feature is set to disabled via the corresponding flag field in the system table, the one or more data modules associated with the selected storage unit perform an operation identified in the request without accessing the configuration table.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Embodiments described herein provide a technique for minimizing runtime feature overhead in a storage system. In particular, the embodiments provide techniques to minimize the runtime feature overhead in a data path for systems that do not actively use the corresponding feature(s) by dynamically enabling and disabling the feature(s) based on configuration information.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data, as well as issue requests for configuration of storage units in the storage system. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium. Also, a storage unit may refer to any unit of storage including those described above with respect to the storage devices, as well as including storage volumes, logical drives, containers, or any unit of storage exposed to a client or application.

In certain embodiments, the term "IO request" or simply "IO" may be used to refer to an input or output request, such as a data read or data write request or a request to configure and/or update a storage unit feature. A feature may refer to any service configurable for the storage system.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data. An exemplary content addressable storage (CAS) array is described in commonly assigned U.S. Pat. No. 9,208,162 (hereinafter "'162 patent"), which is hereby incorporated by reference).

In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

Modern storage systems provide many value added features which bring significant value to its customers who actively use these features. However, for those customers that do not actively use the features, they can result in unwanted performance overhead. For example, for features such as synchronous replication, Quality-of-Service, or online system checkpointing, the system needs to check whether the feature is enabled and active for every request entering the system, whether or not the storage unit the request is written to has the feature configured/enabled. In high-performance storage systems with lots of feature capability, this presents a potential risk during failure recovery. For example, a data module cannot service IO requests until all feature-related configurations become available when the data module is restarted. The embodiments described herein provide a system-wide configuration table through which a management module tracks feature enablement for storage units of a storage system. For each IO request that enters the system, each data module first checks the system wide feature flag in the system table. Only when the system wide feature flag is enabled in the system table, will the system check detailed feature configuration information for the storage unit the request is destined for. Since the system wide feature flag check is very light weight and does not involve extensive object configuration, it relieves the system from feature data path overhead when a feature is not actively in use. These, and other, features will now be described.

Figure 1:
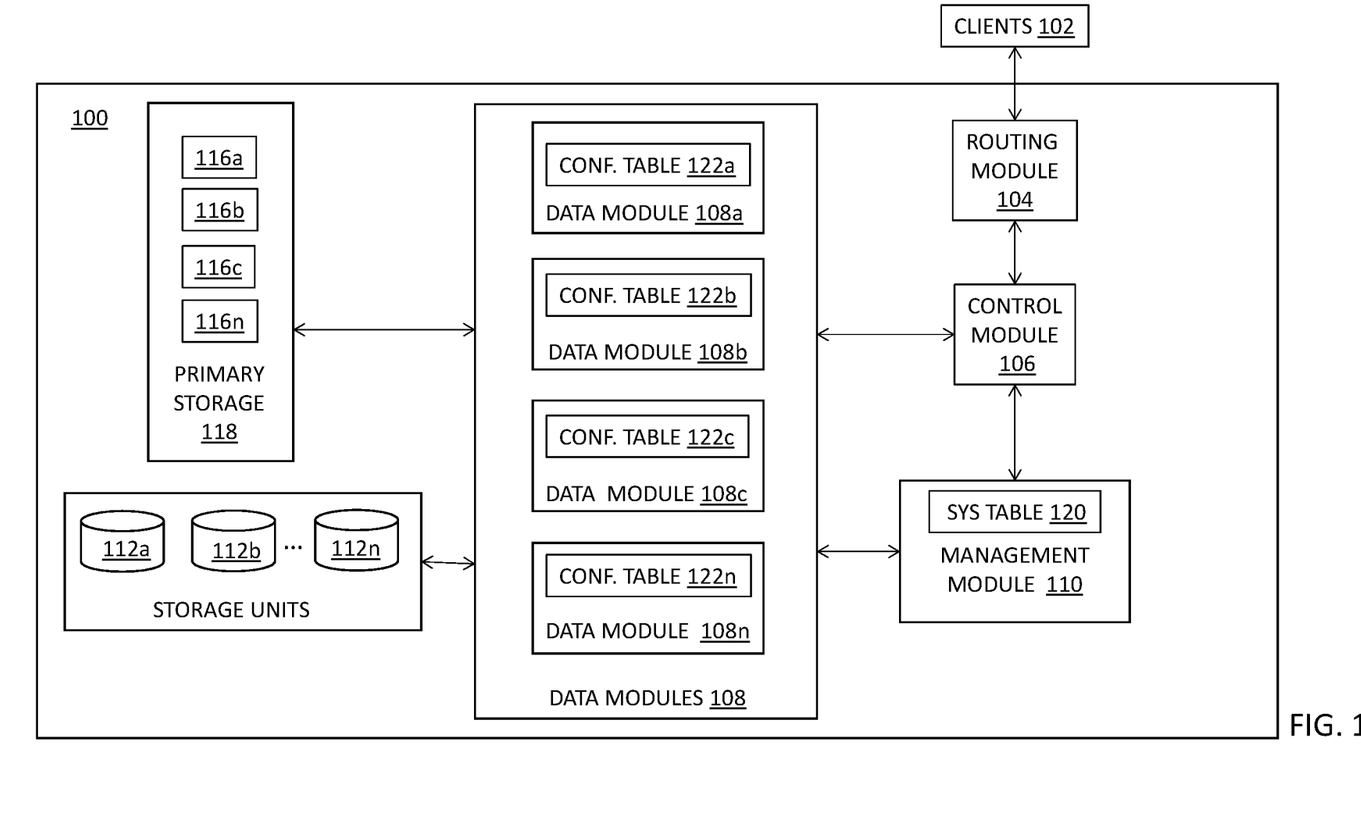
FIG. 1 is a block diagram illustrating one example of a content-based storage system configured for minimizing runtime feature overhead in accordance with an embodiment.

FIG. 1 shows a content-addressable storage system 100 (referred to herein as "storage system") according to an illustrative embodiment. The storage system 100 may include a plurality of modules 104, 106, 108, and 110, a plurality of storage units 112a-112n, which may be implemented as a storage array, and a primary storage 118. In some embodiments, the storage units 112a-112n may be provided as, e.g., storage volumes, logical drives, containers, or any units of storage that are exposed to a client or application (e.g., one of clients 102).

In one embodiment, modules 104, 106, 108, and 110 may be provided as software components, e.g., computer program code that, when executed on a processor, may cause a computer to perform functionality described herein. In a certain embodiment, the storage system 100 includes an operating system (OS) (not shown) and one or more of the modules 104, 106, 108, and 110 may be provided as user space processes executable by the OS. In other embodiments, one or more of the modules 104, 106, 108, and 110 may be provided, at least in part, as hardware, such as digital signal processor (DSP) or an application specific integrated circuit (ASIC) configured to perform functionality described herein. It is understood that the modules 104, 106, 108, and 110 may be implemented as a combination of software components and hardware components. While only a single routing module 104 and control module 106 are shown in FIG. 1, it will be understood that any number of such modules may be employed to realize the advantages of the embodiments described herein.

The routing module 104 may be configured to terminate storage and retrieval operations and distribute commands to the control module 106 that may be selected for the operation in such a way as to retain balanced usage within the system. The routing module 104 can route read/write commands from a client (e.g., one of clients 102) to the control module 106 and the data modules 108a-108n (collectively referred to herein as data modules 108) for execution. The routing module 104 may route SCSI IO requests to the control module 106 for execution and returns results to the clients. In embodiments, data content-based mapping to physical storage can distribute workloads relatively evenly and provide separation of the control and data paths.

The control module 106 may control execution of read and write commands to the storage units 112a-112n. The data modules 108 may be connected to the storage units 112a-112n 112 and, under control of the respective control module 106, may pass data to and/or from the storage units 112a-112n via suitable storage drivers (not shown). The control module 106 may also maintain and manage key metadata elements. In certain embodiments, the control module 106 receives an IO request from the routing module 104, e.g., on a certain sub-LUN (SL), guaranteeing its atomic execution (i.e., execution independent of other processes) and returns the result to the routing module 104. The control module 104 also communicates with the data modules 108 to execute the IO requests.

As shown in FIG. 1, data modules 108a-108n are communicatively coupled to the control module 106 and the management module 110. In embodiments, the data modules 108 are configured to perform the actual read/write (R/W) operations by accessing the storage units 112a-112n attached to them. The data modules 108 may maintain metadata related with the physical location of data blocks. In certain embodiments, the data modules 108 may be responsible functions, such as maintaining a set of LUNs which are attached locally (e.g., via storage units 112a-112n) and performing all IO operations on these LUNs, managing the physical layout of the attached LUNs, managing the mapping between X-Page Data hash digests and their physical locations in a persistent way, managing deduplication of X-Page Data in a persistent way; and receiving disk IO requests from control modules 106, performing them and returning a result.

As indicated above, the data modules 108 perform read/write operations with respect to one or more storage units 112a-112n. In embodiments, each of the data modules 108 is responsible for maintaining a respective configuration table that corresponds to a particular one of the storage units 112 with respect to one or more features available for that storage unit. As indicated above, features may include synchronous replication, asynchronous replication, metro replication, Quality of Service (QoS), and Online System Checkpoint, to name a few. By way of non-limiting example, data module 108a may maintain a configuration table 108a to manage features available for storage unit 112a. In an embodiment, a single data module and corresponding configuration table may be configured to manage the features for a single storage unit. In another embodiment, if multiple data modules are configured to manage system operations for a single storage unit, each data module may contain a configuration table for that storage unit. An example of this configuration is shown and described further in FIG. 3.

The management module 110 may be configured to monitor and track the status of various hardware and software resources within the storage system 100. In some embodiments, the management module 110 may manage the allocation of memory by other modules (e.g., routing module 104, control module 106, and data modules 108). In some embodiments, the management module 110 is configured to monitor the other modules and use this information to determine when the storage system 100 may begin processing client IO operations after a restart.

Figure 2:
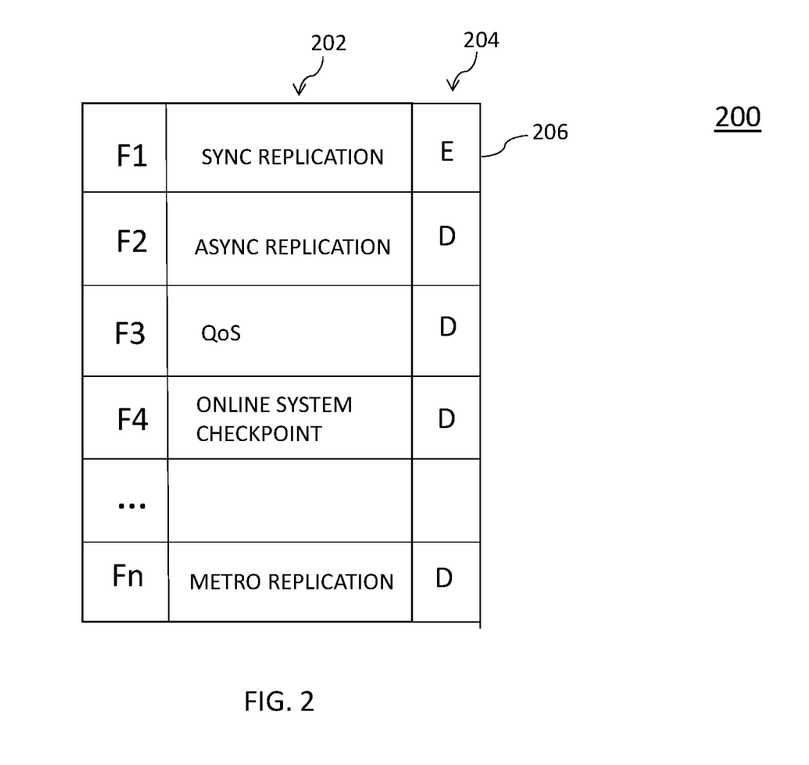
FIG. 2 is a system table of a management module of the content-based storage system of FIG. 1 in accordance with an embodiment.

In embodiments, the management module 110 maintains a system table 120 that is configured to track system-wide (collective) feature functionality of the different storage units of the storage system 100. As shown in FIG. 2 a sample system table 200 includes features (listed in column 202) that are available for one or more storage units in the storage system 100. A system-wide feature flag is set to enabled (E) or disabled (D) for each of the features, as described herein. For example, as shown in FIG. 2, all of the features in column 202 are set to disabled except for F1, synchronous replication, which is set as enabled. This means that at least one storage unit in the storage system 100 has this particular feature enabled for use by a client 102. Note that the table 200 does not reflect which ones of the storage units are enabled for any given feature. The system table 200 is accessible to all of the data modules 108 in the storage system.

The primary memory 118 can be any type of memory having access times that are faster compared to the storage units 112a-112n. In some embodiments, primary memory 118 may be provided as dynamic random-access memory (DRAM). In certain embodiments, primary memory 118 may be provided as synchronous DRAM (SDRAM). In one embodiment, primary memory 118 may be provided as double data rate SDRAM (DDR SDRAM), such as DDR3 SDRAM. These differing types of memory are shown generally in FIG. 1 as 116a-116n.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

Figure 4:
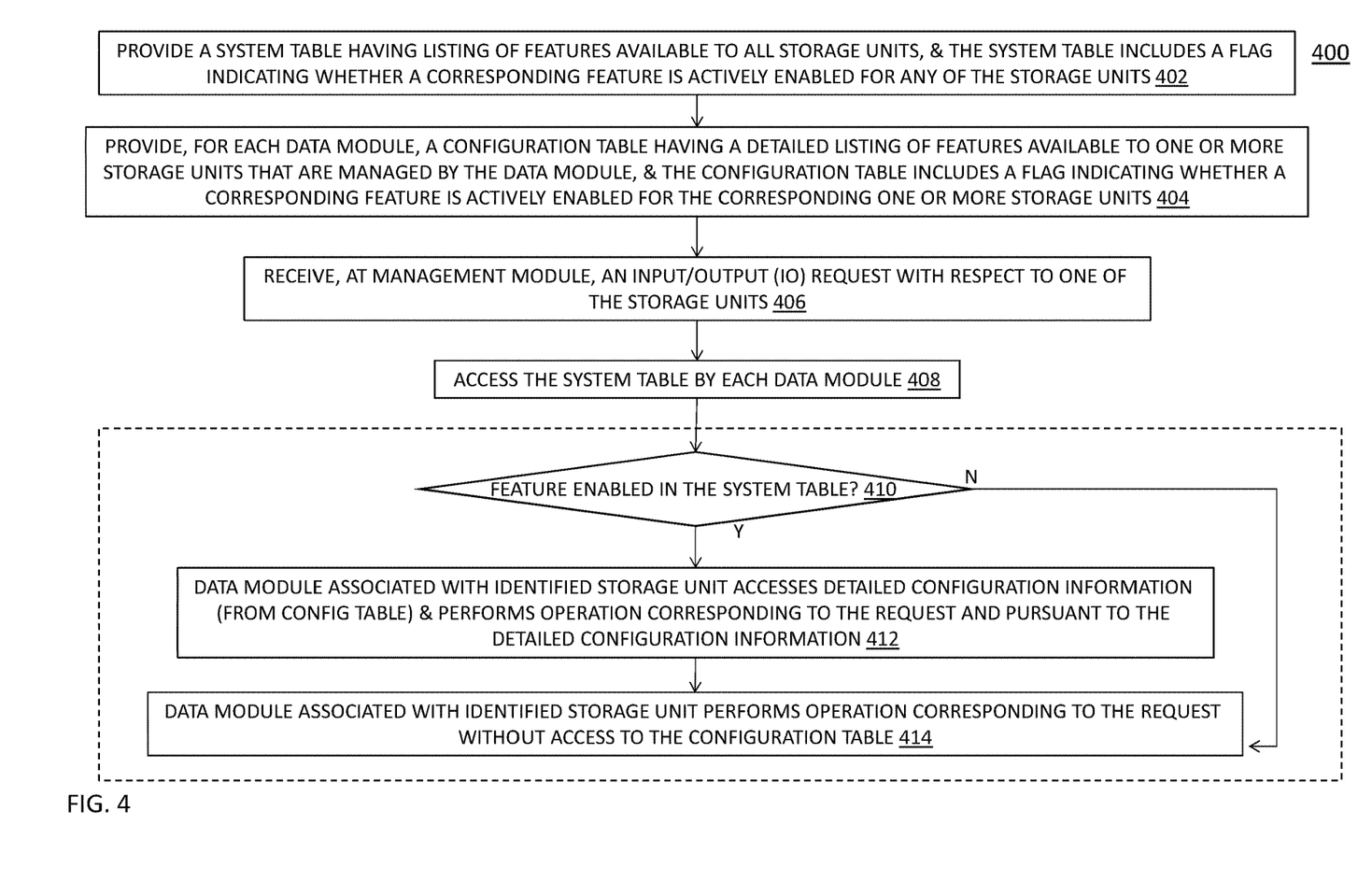
FIG. 4 is a flow diagram illustrating a process for minimizing runtime feature overhead in accordance with an embodiment.

Turning now to FIG. 4, a flow diagram 400 for minimizing feature runtime overhead for the storage system 100 will now be described in accordance with an embodiment. In block 402, a system table (e.g., table 200) is provided for a management module (e.g., module 110) and has a listing of features available to all storage units (e.g., storage units 112a-112n) in a storage system (e.g., storage system 100). The system table 200 refers to the system table 120 of FIG. 1. The system table 200 includes a system-wide feature flag indicating whether a corresponding feature is actively enabled for any of the storage units 112a-112n in the storage system. For example, as shown in FIG. 2, system table 200 includes features F1-Fn and a field (in column 204) is provided for each of the features. In the example shown in FIG. 2, one feature F1 (sync replication) has a flag "E" (206) enabled for the corresponding feature. Where no storage unit in the storage has a particular feature that is enabled and active, the respective flag corresponding to that feature is set to disabled (D) in column 204.

Figure 3:
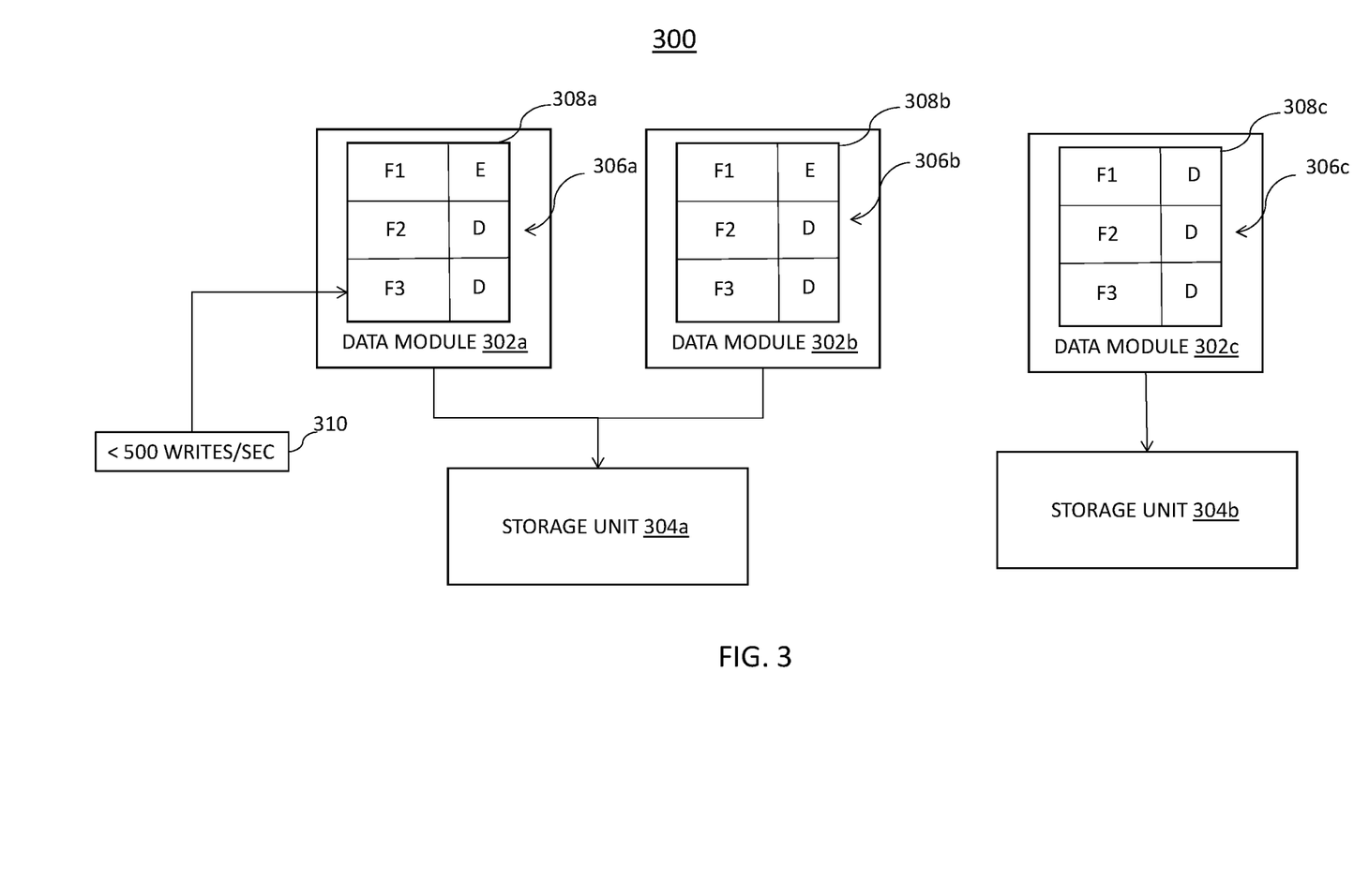
FIG. 3 illustrates data modules and corresponding storage units of the content-based storage system of FIG. 1 in accordance with an embodiment.

In block 404, a detailed configuration table is provided for each of a plurality of data modules. For example, as shown in FIG. 1, configuration table 122a is managed by data module 108a. The configuration table includes a listing of features available to one or more storage units that are managed by the respective data module(s). In particular, the configuration table provides detailed configuration information for the feature as it applies to a particular storage unit. FIG. 3 illustrates sample configuration tables 306a-306c, which are each managed by respective data modules 302a-302c. It is understood that the data modules 302a-302c and configuration tables 306a-306c correspond, respectively, to the data modules 108a-108n and configuration tables 122a-122n of FIG. 1. As indicated above, the configuration table includes features available for storage units of the system under the management of the data module associated with the configuration table. The configuration table includes a listing of the features available for a given storage unit as well as a field that indicates whether the feature is enabled or disabled for the particular storage unit. For example, as shown in FIG. 3, two data modules 302a and 302b are responsible for the feature management of storage unit 304a. Configuration tables 306a and 306b include a column for the feature flag field (308a-308c, respectively). As shown by way of non-limiting illustration, feature F1 has been enabled in feature flag fields 308a and 308b for storage unit 304a, while F1 has been disabled in feature flag field 308c of the configuration table 306c for storage unit 304b.

As indicated above, the configuration tables provide detailed configuration information for features enabled for a corresponding storage unit. For example, if the feature QoS is enabled for a given storage unit, specific configuration information may include limits on the amount of write requests that can be executed for the storage unit within a set time frame. As shown in FIG. 3, e.g., assuming F3 for configuration table 306a is QoS, and that feature is enabled, a policy 310 may provide a limit to the number of write requests per second for the corresponding storage unit. Other types of configuration information with respect to QoS may include, e.g., bandwidth requirements and/or latency requirements.

In block 406, the management module 110 receives an input/output (IO) request with respect to one or more of the storage units 112a-112n. For example, a client 102 may request that a write operation be performed at a particular storage unit. The management module 110 may receive the request from the client 102 via the routing module 104 and the control module 106.

In block 408, each of the data modules access the system table to determine which features are currently enabled at the storage system. For each feature in the system table, the process described in blocks 410-414 is performed.

In block 410, it is determined whether a feature is set to enabled according to the corresponding flag field in the system table 120. That is, if the flag in the system table 120 is set to enabled for the requested feature, this means that this particular feature is actively in use with respect to one or more storage units in the storage system. If the feature, responsive to the search performed in block 408, is set to enabled, the data module associated with the identified storage unit (from the IO request) accesses its detailed configuration table and executes the IO operation pursuant to the request and the detailed configuration information for the enabled feature. For example, if the feature is "sync replication" then the data module replicates the write request accordingly. If the feature is QoS, the data module applies the configuration policies to the write request. For example, if the policy states that write requests reaching or exceeding 500 per second are not permitted, the data module may queue the write request or perform some best effort procedure to execute the request. Thus, only when a feature is determined to be enabled in the system table, will the data modules access their detailed configuration information for that feature with respect to incoming requests. The process continues to the next feature in the system table.

In block 410, if the feature is not set to enabled in the system table, the data module associated with the storage unit subject to the IO request performs an operation pursuant to the IO request without checking its detailed configuration table in block 414. For example, if the IO request is a write request and the feature is "sync replication" the data module executes the write operation locally within the storage system as no replication is enabled for that storage unit. If the IO request is a write request and the feature is QoS, the data module executes the write request without consideration of any QoS policy, such as bandwidth or latency, since that feature is disabled.

Figure 5:
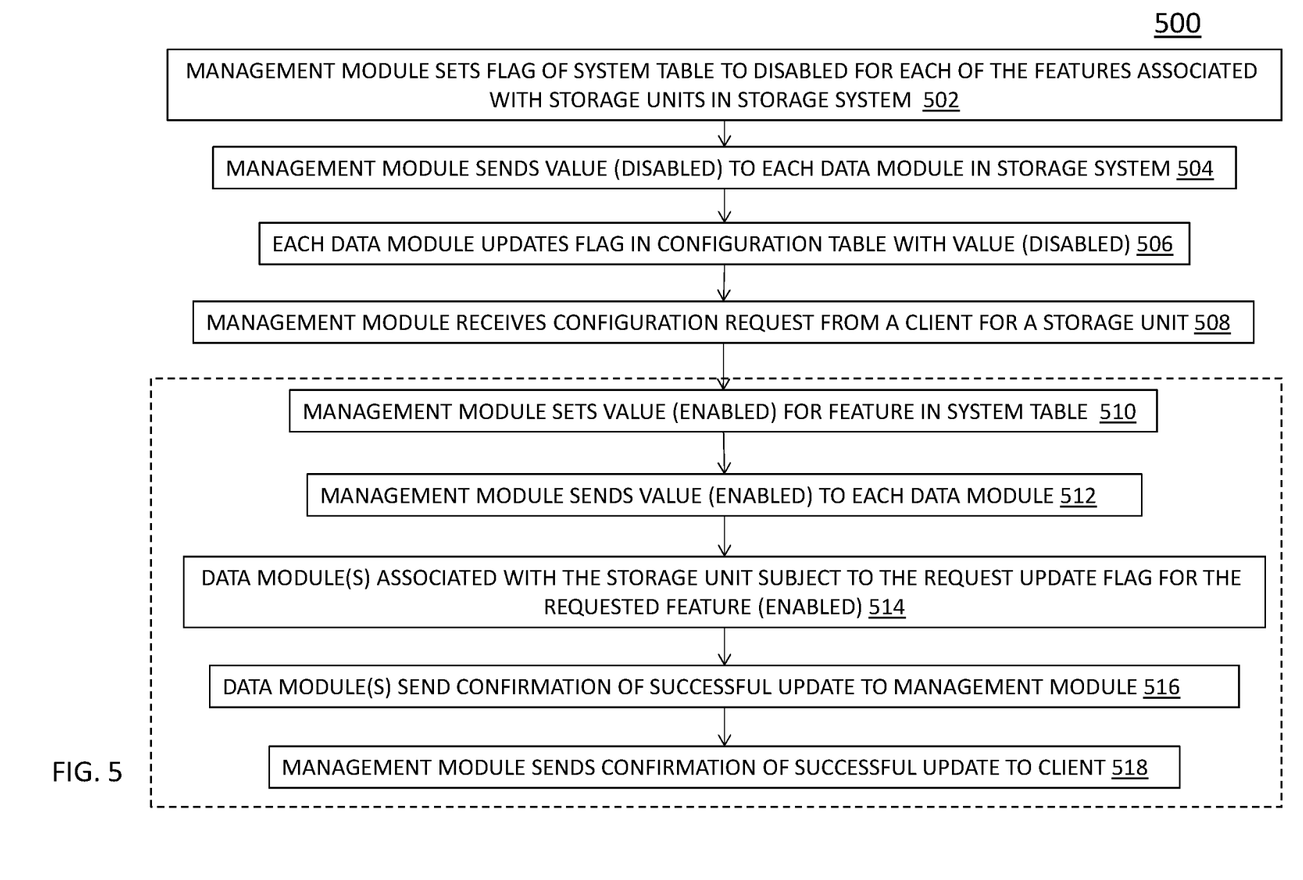
FIG. 5 is a flow diagram illustrating a process for configuring a system to minimize runtime feature overhead in accordance with an embodiment.

Turning now to FIG. 5, a process 500 for configuring the storage system 100 to perform the runtime feature minimization techniques will now be described. The process 500 of FIG. 5 reflects an initialization of the runtime feature minimization technique and is performed one time at the beginning of system configuration. In block 502, the management module 110 sets the feature flag of the system table 120 to disabled for each of the features listed in the table. That is, features F1-Fn are initially set to disabled. In block 504, the management module 110 sends a value "disabled" to each of the data modules 108 in the storage system.

In block 506, each data module 108 updates the flag in its configuration table 122 for the feature to the value "disabled." In block 508, the management module 110 receives a configuration request from a client 102 to configure a storage unit 112 with a feature. In block 510, the management module 110 sets the value for the feature in the system table 120 to enabled.

In block 512, the management module 110 sends the value "enabled" to each of the data modules 108. In block 514, the data modules 108 associated with the storage unit subject to the request from the client 102 update their flags for the requested feature to enabled.

In block 516, the data modules 108 send confirmation of successful update to the management module 110, and the management module 110, in turn, sends confirmation of successful update to the client 102 in block 518. In embodiments, the management module 110 does not send a confirmation of successful update to the requesting client 102 until all data modules 108 in the storage system have responded with a success notification.

For each new feature request received from a client, the process described in block 510-518 is repeated. That is, if a feature subject to a client request has not been previously requested as part of the initialization process of FIG. 5, the process described in blocks 510-518 may be performed until all available features have been addressed.

The system table 120/200 reflects a value of enabled for a given feature even if only one storage unit in the entire storage system is active and enabled. When a client requests a configuration update for a particular storage unit, the process of FIG. 5 first looks to the system table to see if the feature has been enabled for that storage system.

The runtime feature minimization processes are extended to feature de-configuration functions as well as the configuration updates described above. For example, as client requests to disable a given feature for a storage unit are received and processed, the management module 110 tracks these requests and identifies when a feature is no longer active and enabled for any storage unit in the system. In this situation, the management module 110 sets the feature flag for the feature to disabled.

Figure 6:
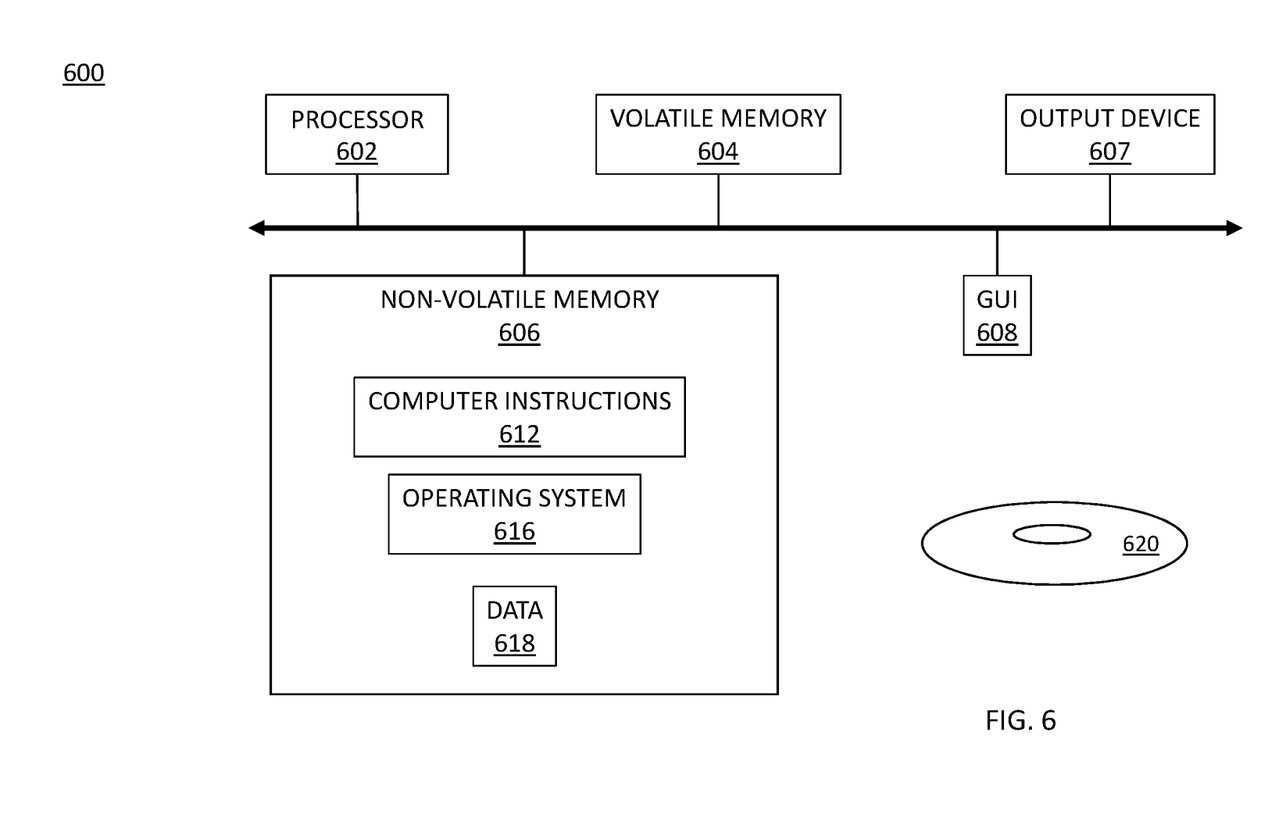
FIG. 6 is a block diagram of an illustrative computer that can perform at least a portion of the processing described herein.

FIG. 6 shows an exemplary computer 600 (e.g., physical or virtual) that can perform at least part of the processing described herein. The computer 600 includes a processor 602, a volatile memory 604, a non-volatile memory 606 (e.g., hard disk or flash), an output device 607 and a graphical user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604. In one embodiment, an article 620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

We claim:

1. A method for minimizing runtime feature overhead in a storage system, the method comprising:
   providing, for a management module of the storage system, a system table having a listing of features that are available for the storage system, the system table including a flag field for each of the features that indicates whether a corresponding feature in the listing of features is currently enabled in the storage system;
   providing, for each data module of a plurality of data modules in the storage system, a configuration table having a listing of features available to one or more storage units under management of the corresponding data module, the configuration table including a flag field for each of the features that indicates whether a corresponding feature in the listing of features for the configuration table is enabled for the corresponding one or more storage units;
   upon receiving, at the management module, an input/output (IO) request from a client system, the IO request including a selected storage unit of the storage units, the data modules perform:
   accessing the system table;
   for each feature in the system table, determining whether the feature is set to enabled via the corresponding flag field;
   upon determining feature is set to enabled in the system table:
   accessing configuration information in the configuration table for the enabled feature; and
   performing, by the one or more data modules associated with the selected storage unit, an operation identified in the request pursuant to the configuration information; and
   upon determining the feature is set to disabled via the corresponding flag field in the system table, performing, by the one or more data modules associated with the selected storage unit, an operation identified in the request without accessing the configuration table.

2. The method of claim 1, wherein the features include synchronous replication, asynchronous replication, Quality-of-Service, metro replication, and online system checkpoint.

3. The method of claim 1, further comprising configuring the system table during an initialization process, the configuring including:
   setting the flag field for each of the features in the listing of features of the system table to disabled; and
   sending a request to each of the data modules to update a corresponding flag field for each of the features in the listing of features for the corresponding configuration table to disabled.

4. The method of claim 3, further comprising configuring the configuration tables during the initialization process, the configuring including:

receiving, at the data modules, the request to update the corresponding flag field for each of the features in the listing of features; and
setting, by each of the data modules, each of the flag fields in the corresponding configuration tables to disabled for each of the features in the listing of features.

5. The method of claim 4, wherein the initialization process further comprises:
   upon receiving a request from the client system to configure one of the storage units for a feature, setting the flag field for the feature in the system table to enabled, and sending a request to each of the data modules to update corresponding flag fields for the feature in the configuration tables.

6. The method of claim 5, wherein the initialization process further comprises:
   upon receiving the request from the management module, each of the data modules performs:
   identifying the storage unit subject to the request; and
   updating, by the data module that manages the identified storage unit, the flag field in the configuration table to enabled.

7. A system for minimizing runtime feature overhead in a storage system, the system comprising:
   a memory comprising computer-executable instructions; and
   a processor operable by a storage system, the processor executing the computer-executable instructions, the computer-executable instructions when executed by the processor cause the processor to perform operations comprising:
   providing, for a management module of the storage system, a system table having a listing of features that are available for the storage system, the system table including a flag field for each of the features that indicates whether a corresponding feature in the listing of features is currently enabled in the storage system;
   providing, for each data module of a plurality of data modules in the storage system, a configuration table having a listing of features available to one or more storage units under management of the corresponding data module, the configuration table including a flag field for each of the features that indicates whether a corresponding feature in the listing of features for the configuration table is enabled for the corresponding one or more storage units;
   upon receiving, at the management module, an input/output (IO) request from a client system, the request including a selected storage unit of the storage units, the data modules perform:
   accessing the system table;
   for each feature in the system table, determining whether the feature is set to enabled via the corresponding flag field;
   upon determining the feature is set to enabled in the system table:
   accessing configuration information in the configuration table for the enabled feature; and
   performing, by the one or more data modules associated with the selected storage unit, an operation identified in the request pursuant to the configuration information; and
   upon determining the feature is set to disabled via the corresponding flag field in the system table, performing, by the one or more data modules associated with the selected storage unit, an operation identified in the request without accessing the configuration table.

8. The system of claim 7, wherein the features include synchronous replication, asynchronous replication, Quality-of-Service, metro replication, and online system checkpoint.

9. The system of claim 7, wherein the operations further comprise configuring the system table during an initialization process, the configuring including:
setting the flag field for each of the features in the listing of features of the system table to disabled; and
sending a request to each of the data modules to update a corresponding flag field for each of the features in the listing of features for the corresponding configuration table to disabled.

10. The system of claim 9, wherein the operations further comprise configuring the configuration tables during the initialization process, the configuring including:
receiving, at the data modules, the request to update the corresponding flag field for each of the features in the listing of features; and
setting, by each of the data modules, each of the flag fields in the corresponding configuration tables to disabled for each of the features in the listing of features.

11. The system of claim 10, wherein the initialization process further comprises:
upon receiving a request from the client system to configure one of the storage units for a feature, setting the flag field for the feature in the system table to enabled, and sending a request to each of the data modules to update corresponding flag fields for the feature in the configuration tables.

12. The system of claim 11, wherein the initialization process further comprises:
upon receiving the request from the management module, each of the data modules performs:
identifying the storage unit subject to the request; and
updating, by the data module that manages the identified storage unit, the flag field in the configuration table to enabled.

13. A computer program product embodied on a non-transitory computer readable medium, the computer program product including instructions that, when executed by a computer, causes the computer to perform operations comprising:
providing, for a management module of a storage system, a system table having a listing of features that are available for the storage system, the system table including a flag field for each of the features that indicates whether a corresponding feature in the listing of features is currently enabled in the storage system;
providing, for each data module of a plurality of data modules in the storage system, a configuration table having a listing of features available to one or more storage units under management of the corresponding data module, the configuration table including a flag field for each of the features that indicates whether a corresponding feature in the listing of features for the configuration table is enabled for the corresponding one or more storage units;
upon receiving, at the management module, a configuration update request from a client system, the configuration update request including a selected storage unit of the storage units, the data modules perform:
accessing the system table;
upon determining the selected one of the features is set to enabled in the system table:
accessing configuration information in the configuration table for the enabled feature; and
performing, by the one or more data modules associated with the selected storage unit, an operation identified in the request pursuant to the configuration information; and
upon determining the feature is set to disabled via the corresponding flag field in the system table, performing, by the one or more data modules associated with the selected storage unit, an operation identified in the request without accessing the configuration table.

14. The computer program product of claim 13, wherein the features include synchronous replication, asynchronous replication, Quality-of-Service, metro replication, and online system checkpoint.

15. The computer program product of claim 13, wherein the operations further comprise configuring the system table during an initialization process, the configuring including:
setting the flag field for each of the features in the listing of features of the system table to disabled; and
sending a request to each of the data modules to update a corresponding flag field for each of the features in the listing of features for the corresponding configuration table to disabled.

16. The computer program product of claim 15, wherein the operations further comprise configuring the configuration tables during the initialization process, the configuring including:
receiving, at the data modules, the request to update the corresponding flag field for each of the features in the listing of features; and
setting, by each of the data modules, each of the flag fields in the corresponding configuration tables to disabled for each of the features in the listing of features.

17. The computer program product of claim 16, wherein the initialization process further comprises:
upon receiving a request from the client system to configure one of the storage units for a feature, setting the flag field for the feature in the system table to enabled, and sending a request to each of the data modules to update corresponding flag fields for the feature in the configuration tables.

18. The computer program product of claim 17, wherein the initialization process further comprises:
upon receiving the request from the management module, each of the data modules performs:
identifying the storage unit subject to the request; and
updating, by the data module that manages the identified storage unit, the flag field in the configuration table to enabled.

* * * * *